United States Patent
Guo et al.

(10) Patent No.: US 10,114,762 B2
(45) Date of Patent: Oct. 30, 2018

(54) METHOD AND APPARATUS FOR QUERYING PHYSICAL MEMORY ADDRESS

(71) Applicant: Huawei Technologies Co., Ltd., Shenzhen (CN)

(72) Inventors: Xubin Guo, Beijing (CN); Rui Hou, Beijing (CN); Yujing Feng, Beijing (CN); Dongfeng Su, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/047,938

(22) Filed: Feb. 19, 2016

(65) Prior Publication Data

US 2016/0170904 A1 Jun. 16, 2016

Related U.S. Application Data

(63) Continuation of application No. PCT/CN2014/083875, filed on Aug. 7, 2014.

(30) Foreign Application Priority Data

Aug. 20, 2013 (CN) .......................... 2013 1 0364417

(51) Int. Cl.
*G06F 12/10* (2016.01)
*G06F 12/1045* (2016.01)
(Continued)

(52) U.S. Cl.
CPC ...... *G06F 12/1045* (2013.01); *G06F 12/0842* (2013.01); *G06F 12/1027* (2013.01);
(Continued)

(58) Field of Classification Search
CPC ............. G06F 12/0862; G06F 12/1027; G06F 12/0842; G06F 12/1045; G06F 12/1009;
(Continued)

(56) References Cited

U.S. PATENT DOCUMENTS 8,880,844 B1 * 11/2014 Bhattacharjee ..... G06F 12/0215
707/741
9,003,120 B2 4/2015 Huang
(Continued)

FOREIGN PATENT DOCUMENTS

CN 101055533 A 10/2007
CN 101833440 A 9/2010
(Continued)

OTHER PUBLICATIONS

Partial English Translation and Abstract of Chinese Patent Application No. CN101055533, Oct. 17, 2007, 10 pages.
(Continued)

*Primary Examiner* — Larry T Mackall
(74) *Attorney, Agent, or Firm* — Conley Rose, P.C.

(57) ABSTRACT

A method and an apparatus for querying a physical memory address where the method includes storing, into a prefetch buffer, page table entries of a second thread that is to perform addressing that are stored in a standby buffer, where the standby buffer stores page table entries that are not queried within a set time in a translation lookaside buffer (TLB), receiving a memory addressing request message that carries a virtual address and is sent by the second thread, and querying, in the TLB and the prefetch buffer, a corresponding physical address according to the virtual address.

20 Claims, 6 Drawing Sheets (51) Int. Cl.
*G06F 12/0842* (2016.01)
*G06F 12/1027* (2016.01)
*G06F 12/0862* (2016.01)
*G06F 12/1009* (2016.01)

(52) U.S. Cl.
CPC ...... *G06F 12/0862* (2013.01); *G06F 12/1009* (2013.01); *G06F 2212/1016* (2013.01); *G06F 2212/1021* (2013.01); *G06F 2212/6022* (2013.01); *G06F 2212/654* (2013.01); *G06F 2212/68* (2013.01); *G06F 2212/681* (2013.01)

(58) Field of Classification Search
CPC ........... G06F 2212/681; G06F 2212/68; G06F 2212/654; G06F 2212/6022; G06F 2212/1021; G06F 2212/1016
See application file for complete search history.

(56) References Cited

U.S. PATENT DOCUMENTS

| | | |
|---|---|---|
| 2005/0050296 A1 | 3/2005 | Kottapalli et al. |
| 2006/0206686 A1 | 9/2006 | Banerjee et al. |
| 2007/0067602 A1* | 3/2007 | Callister ............. G06F 12/1027 711/207 |
| 2009/0327649 A1 | 12/2009 | Banerjee et al. |
| 2010/0235586 A1* | 9/2010 | Gonion ............... G06F 12/0831 711/144 |
| 2011/0010521 A1 | 1/2011 | Wang et al. |
| 2011/0029755 A1 | 2/2011 | Naruse |
| 2012/0290732 A1 | 11/2012 | Suganthi et al. |
| 2014/0108766 A1* | 4/2014 | Desai .................. G06F 12/1027 711/205 |
| 2014/0257821 A1* | 9/2014 | Adams .................... G10L 25/93 704/275 |

FOREIGN PATENT DOCUMENTS

| | | |
|---|---|---|
| CN | 102369520 A | 3/2012 |
| CN | 102498477 A | 6/2012 |
| CN | 102708211 A | 10/2012 |
| JP | S5998367 A | 6/1984 |
| JP | H0652058 A | 2/1994 |

OTHER PUBLICATIONS

Partial English Translation and Abstract of Chinese Patent Application No. CN101833440, Sep. 15, 2010, 12 pages.
Partial English Translation and Abstract of Chinese Patent Application No. CN102708211, Oct. 3, 2012, 8 pages.
Foreign Communication From a Counterpart Application, Chinese Application No. 201310364417.1, Chinese Office Action dated Jan. 4, 2017, 5 pages.
Foreign Communication From a Counterpart Application, European Application No. 14838503.2, Extended European Search Report dated Jun. 7, 2016, 7 pages.
Foreign Communication From a Counterpart Application, PCT Application No. PCT/CN2014/083875, English Translation of International Search Report dated Nov. 18, 2014, 2 pages.
Foreign Communication From a Counterpart Application, PCT Application No. PCT/CN2014/083875, English Translation of Written Opinion dated Nov. 17, 2014, 7 pages.
Machine Translation and Abstract of Japanese Publication No. JPH06052058, Feb. 25, 1994, 14 pages.
Machine Translation and Abstract of Japanese Publication No. JPS59098367, Jun. 6, 1984, 8 pages.
Foreign Communication From a Counterpart Application, Japanese Application No. 2016-535319, Japanese Office Action dated Apr. 4, 2017, 2 pages.
Foreign Communication From a Counterpart Application, Japanese Application No. 2016-535319, English Translation Japanese Office Action dated Apr. 4, 2017, 2 pages.

* cited by examiner

METHOD AND APPARATUS FOR QUERYING PHYSICAL MEMORY ADDRESS

CROSS-REFERENCE TO RELATED APPLICATIONS

This application is a continuation of International Application No. PCT/CN2014/083875, filed on Aug. 7, 2014, which claims priority to Chinese Patent Application No. 201310364417.1, filed on Aug. 20, 2013, both of which are hereby incorporated by reference in their entireties.

TECHNICAL FIELD

The present disclosure relates to the field of information technologies, and in particular, to a method and an apparatus for querying a physical memory address.

BACKGROUND

At present, processors mainly use a virtual address (VA) to perform memory addressing, and addressing space that is much larger than actual physical address (PA) space may be created using a virtual address technology. Processors that use a virtual memory mainly use a paging mechanism. Virtual address space is divided in a unit of page. Correspondingly, physical address space is also divided in a unit of page. In a process of performing memory addressing using a virtual address, a memory management unit (MMU) in a processor needs to translate a received virtual address into a physical address. At present, processors mainly use a bypass translation buffer, i.e. a translation lookaside buffer (TLB) that includes a mapping relationship between a virtual address and a physical address of memory recently accessed by the processors. Data buffered in the TLB is consistent with data stored in a memory page table area, and in the memory page table area, each record that includes a mapping relationship between a virtual address and a physical address is referred to as a page table entry (PTE). Similarly, the TLB also buffers a part or even all of PTEs.

When memory addressing is performed using a virtual address, after receiving a virtual address sent by an application program, first, an MMU performs searching in a TLB of a bypass translation buffer. If the TLB buffers a page table entry corresponding to the virtual address, this means, the TLB is hit, the MMU performs data access in a level 1 cache using a physical address in the page table entry. If data corresponding to the physical address does not exist in the level 1 cache, the MMU performs data access in a level 2 cache. If data corresponding to the physical address does not exist in the level 2 cache, the MMU performs data access in memory. If the TLB does not include the PTE corresponding to the virtual address, this means, the TLB is missed, software or an operating system (OS) needs to search for a physical address corresponding to the virtual address, and use a mapping relationship between the virtual address and the physical address as a PTE and store the PTE into the TLB, such that the MMU can perform subsequent searching.

In the prior art, a prefetch buffer (PB) is disposed in an MMU, where the PB stores multiple PTEs. When addressing of a physical memory address is performed, first, a TLB is searched for a corresponding physical address, and after the TLB is missed, the PB is continued to be searched for the corresponding physical address. If the corresponding physical address exists in the PB, data access is performed using the physical address, and a hit page table entry is stored into the TLB. If the corresponding physical address does not exist in the PB, multiple PTEs in memory are stored into the PB, to overwrite data currently stored in the PB.

However, for a multi-threaded processor, multiple hardware threads share one TLB, and because a capacity of a TLB is limited, when a quantity of hardware threads is relatively large, a quantity of PTEs in the TLB cannot meet a multi-thread requirement. As a result, when each hardware thread performs memory addressing using a virtual address, a miss rate of the TLB is relatively high, and only after the TLB is missed, a PTE corresponding to the virtual address can be acquired from memory and then buffered. Therefore, an addressing time is relatively long.

SUMMARY

The present disclosure provides a method and an apparatus for querying a physical memory address, in order to solve a problem that an addressing time is relatively long in the prior art.

According to a first aspect, the present disclosure provides a method for querying a physical memory address, including determining, according to a preset thread switching policy, that a memory addressing operation is switched from a first thread to a second thread within a future set time; storing, into a prefetch buffer, page table entries of the second thread that are stored in a standby buffer, where the standby buffer stores page table entries that are not queried within a set time in a TLB that is stored in a bypass translation buffer; receiving a memory addressing request message corresponding to the second thread, where the memory addressing request message carries a virtual address; and querying, according to the virtual address and in page table entries stored in the bypass translation buffer and the page table entries stored in the prefetch buffer, a physical address corresponding to the virtual address.

In a first possible implementation manner of the first aspect, the querying, according to the virtual address and in page table entries stored in the bypass translation buffer and the page table entries stored in the prefetch buffer, a physical address corresponding to the virtual address includes, if a first physical address corresponding to the virtual address exists in the bypass translation buffer, accessing memory using the first physical address, in order to perform data access; or if a first physical address corresponding to the virtual address does not exist in the bypass translation buffer, but a second physical address corresponding to the virtual address exists in the prefetch buffer, accessing memory using the second physical address, in order to perform data access.

According to the first possible implementation manner of the first aspect, in a second possible implementation manner, the method further includes, if the first physical address corresponding to the virtual address does not exist in the bypass translation buffer, and the second physical address corresponding to the virtual address does not exist in the prefetch buffer, querying the memory for a third physical address corresponding to the virtual address.

According to the first possible implementation manner and the second possible implementation manner of the first aspect, in a third possible implementation manner, if the first physical address corresponding to the virtual address does not exist in the bypass translation buffer, but the second physical address corresponding to the virtual address exists in the prefetch buffer, the method further includes storing, into the bypass translation buffer, a PTE that is corresponding to the virtual address and the second physical address and is stored in the prefetch buffer, and deleting, from the prefetch buffer, the PTE that is corresponding to the virtual address and the second physical address.

According to the second possible implementation manner of the first aspect, in a fourth possible implementation manner, the method further includes storing, into the bypass translation buffer, a PTE that is corresponding to the virtual address and the third physical address and is found in the memory.

According to the first possible implementation manner, the second possible implementation manner, the third possible implementation manner, and the fourth possible implementation manner of the first aspect, in a fifth possible implementation manner, before the storing, into a prefetch buffer, PTEs of the second thread that are stored in a standby buffer, the method further includes, if a quantity of page table entries stored in the bypass translation buffer exceeds a storage capacity of the bypass translation buffer, storing, into the standby buffer, the PTEs that are not queried within the set time in the bypass translation buffer, and deleting, from the bypass translation buffer, the PTEs that are not queried within the set time.

According to the fifth possible implementation manner of the first aspect, in a sixth possible implementation manner, after the storing, into the standby buffer, the PTEs that are not queried within the set time in the bypass translation buffer, the method further includes, if a quantity of page table entries stored in the standby buffer exceeds a storage capacity of the standby buffer, deleting a PTE with a longest storage time from the standby buffer.

According to the first possible implementation manner, the second possible implementation manner, the third possible implementation manner, the fourth possible implementation manner, the fifth possible implementation manner, and the sixth possible implementation manner of the first aspect, in a seventh possible implementation manner, the storing, into a prefetch buffer, PTEs of the second thread that are stored in a standby buffer includes, if a quantity of the page table entries of the second thread that are stored in the standby buffer is less than or equal to a storage capacity of the prefetch buffer, storing, into the prefetch buffer, all the page table entries of the second thread that are stored in the standby buffer, and overwriting data currently stored in the prefetch buffer, or if a quantity of the page table entries of the second thread that are stored in the standby buffer is greater than a storage capacity of the prefetch buffer, storing, into the prefetch buffer, page table entries, of which a quantity is equal to the storage capacity of the prefetch buffer, of the second thread that are stored in the standby buffer, and overwriting data currently stored in the prefetch buffer.

According to the seventh possible implementation manner of the first aspect, in an eighth possible implementation manner, if the quantity of the PTEs of the second thread that are stored in the standby buffer is greater than the storage capacity of the prefetch buffer, the method further includes, if the first physical address corresponding to the virtual address does not exist in the bypass translation buffer, but the second physical address corresponding to the virtual address exists in the prefetch buffer, storing, into the prefetch buffer, a PTE, except the PTEs stored in the prefetch buffer, of the PTEs of the second thread that are stored in the standby buffer.

According to a second aspect, the present disclosure provides an apparatus for querying a physical memory address, including a determining module configured to determine, according to a preset thread switching policy, that a memory addressing operation is switched from a first thread to a second thread within a future set time, an executing module configured to store, into a prefetch buffer, PTEs of the second thread that are stored in a standby buffer, where the standby buffer stores PTEs that are not queried within a set time in a TLB that is stored in a bypass translation buffer, a receiving module configured to receive a memory addressing request message corresponding to the second thread, where the memory addressing request message carries a virtual address, and a querying module configured to query, according to the virtual address and in page table entries stored in the bypass translation buffer and the page table entries stored in the prefetch buffer, a physical address corresponding to the virtual address.

In a first possible implementation manner of the second aspect, the querying module is further configured to, if a first physical address corresponding to the virtual address exists in the bypass translation buffer, access memory using the first physical address, in order to perform data access, or if a first physical address corresponding to the virtual address does not exist in the bypass translation buffer, but a second physical address corresponding to the virtual address exists in the prefetch buffer, access memory using the second physical address, in order to perform data access.

According to the first possible implementation manner of the second aspect, in a second possible implementation manner, the querying module is further configured to, if the first physical address corresponding to the virtual address does not exist in the bypass translation buffer, and the second physical address corresponding to the virtual address does not exist in the prefetch buffer, query the memory for a third physical address corresponding to the virtual address.

According to the first possible implementation manner and the second possible implementation manner of the second aspect, in a third possible implementation manner, the querying module is further configured to, if the first physical address corresponding to the virtual address does not exist in the bypass translation buffer, but the second physical address corresponding to the virtual address exists in the prefetch buffer, store, into the bypass translation buffer, a PTE that is corresponding to the virtual address and the second physical address and is stored in the prefetch buffer, and delete, from the prefetch buffer, the PTE that is corresponding to the virtual address and the second physical address.

According to the second possible implementation manner of the second aspect, in a fourth possible implementation manner, the querying module is further configured to store, into the bypass translation buffer, a PTE that is corresponding to the virtual address and the third physical address and is found in the memory.

According to the first possible implementation manner, the second possible implementation manner, the third possible implementation manner, and the fourth possible implementation manner of the second aspect, in a fifth possible implementation manner, the executing module is further configured to, before the page table entries of the second thread that are stored in the standby buffer are stored into the prefetch buffer, if a quantity of PTEs stored in the bypass translation buffer exceeds a storage capacity of the bypass translation buffer, store, into the standby buffer, the PTEs that are not queried within the set time in the bypass translation buffer, and delete, from the bypass translation buffer, the PTEs that are not queried within the set time.

According to the fifth possible implementation manner of the second aspect, in a sixth possible implementation manner, the executing module is further configured to, after the PTEs that are not queried within the set time in the bypass translation buffer are stored into the standby buffer, if a quantity of PTEs stored in the standby buffer exceeds a storage capacity of the standby buffer, delete a PTE with a longest storage time from the standby buffer.

According to the first possible implementation manner, the second possible implementation manner, the third possible implementation manner, the fourth possible implementation manner, the fifth possible implementation manner, and the sixth possible implementation manner of the second aspect, in a seventh possible implementation manner, the executing module is further configured to, if a quantity of the PTEs of the second thread that are stored in the standby buffer is less than or equal to a storage capacity of the prefetch buffer, store, into the prefetch buffer, all the PTEs of the second thread that are stored in the standby buffer, and overwrite data currently stored in the prefetch buffer, or if a quantity of the PTEs of the second thread that are stored in the standby buffer is greater than a storage capacity of the prefetch buffer, store, into the prefetch buffer, PTEs, of which a quantity is equal to the storage capacity of the prefetch buffer, of the second thread that are stored in the standby buffer, and overwrite data currently stored in the prefetch buffer.

According to the seventh possible implementation manner of the second aspect, in an eighth possible implementation manner, the executing module is further configured to, if the quantity of the PTEs of the second thread that are stored in the standby buffer is greater than the storage capacity of the prefetch buffer, the first physical address corresponding to the virtual address does not exist in the bypass translation buffer, but the second physical address corresponding to the virtual address exists in the prefetch buffer, store, into the prefetch buffer, a PTE, except the PTEs stored in the prefetch buffer, of the PTEs of the second thread that are stored in the standby buffer.

According to a third aspect, the present disclosure provides an apparatus for querying a physical memory address, including a memory, a bypass translation buffer, a standby buffer, a prefetch buffer, and a processor, where the memory is configured to store an instruction, the bypass translation buffer is configured to store a TLB, the standby buffer is configured to store PTEs that are not queried within a set time in the TLB that is stored in the bypass translation buffer, the prefetch buffer is configured to store PTEs of a corresponding thread that are stored in the standby buffer, and the processor is configured to run the instruction stored in the memory, in order to perform the method for querying a physical memory address according to the first aspect.

According to the method and the apparatus for querying a physical memory address provided in the present disclosure, a bypass translation buffer and a prefetch buffer are queried at the same time according to a to-be-addressed virtual address of a second thread, where the prefetch buffer stores PTEs of the second thread that are not queried within a set time in the bypass translation buffer, thereby increasing a hit rate of querying a physical address corresponding to a virtual address, and shortening an addressing time.

BRIEF DESCRIPTION OF DRAWINGS

To describe the technical solutions in the embodiments of the present disclosure more clearly, the following briefly introduces the accompanying drawings may be required for describing the embodiments.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure.

Figure 1:
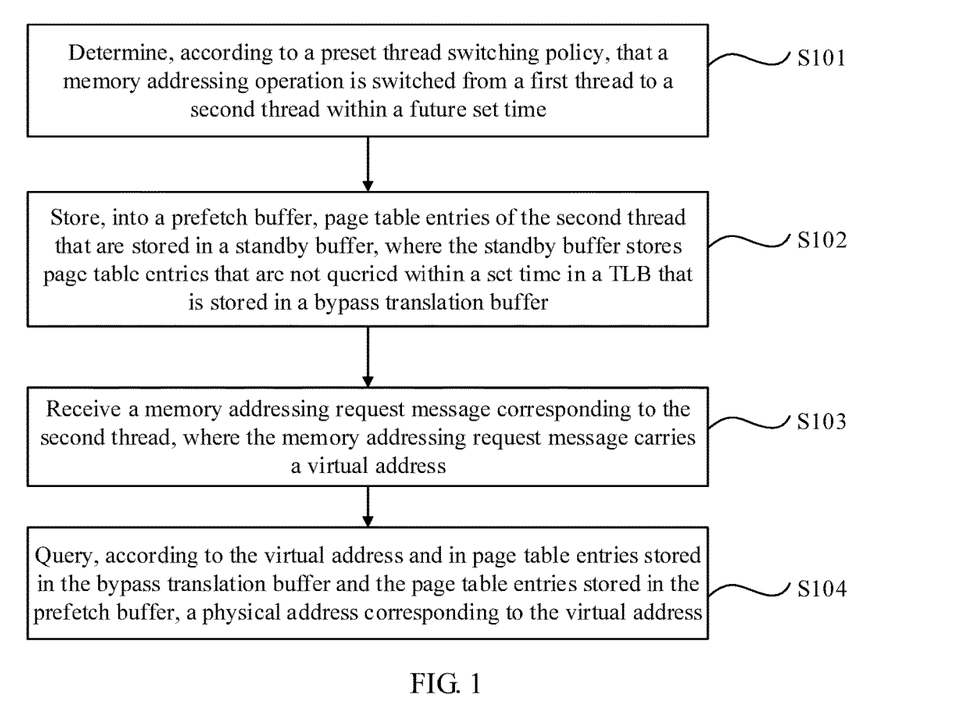
FIG. 1 is a schematic flowchart of an embodiment of a method for querying a physical memory address according to the present disclosure.

FIG. 1 is a schematic flowchart of an embodiment of a method for querying a physical memory address according to the present disclosure. As shown in FIG. 1, the method provided in the following method embodiment may be applicable to various types of terminal devices, such as a personal computer (PC), a PAD, and a mobile phone. The following steps may be performed by a central processing unit (CPU) in the foregoing various terminal devices, and may be performed by a MMU in the CPU, and the like. The method may further include:

Step S101: Determine, according to a preset thread switching policy, that a memory addressing operation is switched from a first thread to a second thread within a future set time.

Furthermore, the thread switching policy includes using which threads to perform a memory addressing operation within each time period during running of a terminal device. In this embodiment of the present disclosure, the first thread is a thread that performs a memory addressing operation within a previous time period, and the second thread is a thread that performs a memory addressing operation after the first thread, that is, a thread that is to perform addressing.

Step S102: Store, into a prefetch buffer, PTEs of the second thread that are stored in a standby buffer, where the standby buffer stores PTEs that are not queried within a set time in a TLB that is stored in a bypass translation buffer.

Furthermore, the thread that is to perform addressing and determined according to step S101, the second thread, stores, into the PB, the PTEs of the second thread that are stored in the standby buffer, where the standby buffer stores the PTEs that are not queried within the set time in the TLB that is stored in the bypass translation buffer. Optionally, the PTEs stored in the standby buffer may further include a correspondence between a virtual address and a physical address, and an identity of each corresponding thread. Similarly, PTEs stored in the bypass translation buffer may also include a correspondence between a virtual address and a physical address, and an identity of each corresponding thread, and the PTEs stored in the PB may include a correspondence between a virtual address and a physical address, and an identity of a corresponding thread that is to perform addressing.

It should be noted herein that a quantity of standby buffers may be one or multiple. For example, each thread may be corresponding to one standby buffer, where the standby buffer is used to store PTEs of the thread that are not queried within a set time in a bypass translation buffer. Similarly, both a quantity of bypass translation buffers and a quantity of prefetch buffers may be one or multiple. For example, each thread may be corresponding to one bypass translation buffer and one prefetch buffer.

Step S103: Receive a memory addressing request message corresponding to the second thread, where the memory addressing request message carries a virtual address.

Furthermore, the memory addressing request message corresponding to the thread that is to perform addressing, in other words, the second thread, is received, where the memory addressing request message carries a to-be-addressed VA.

Step S104: Query, according to the virtual address and in page table entries stored in the bypass translation buffer and the page table entries stored in the prefetch buffer, a physical address corresponding to the virtual address.

Furthermore, the PTEs stored in the bypass translation buffer and the PTEs stored in the PB may be queried at the same time according to the VA. If the physical address corresponding to the VA exists in the bypass translation buffer or the PB, data access is performed using this physical address, and if the physical address corresponding to the VA exists in neither the bypass translation buffer nor the PB, memory is queried to obtain the physical address corresponding to the VA.

According to the method for querying a physical memory address provided in this embodiment, a bypass translation buffer and a prefetch buffer are queried at the same time according to a to-be-addressed virtual address of a second thread, where the prefetch buffer stores PTEs of the second thread that are not queried within a set time in the bypass translation buffer, thereby increasing a hit rate of querying a physical address corresponding to a virtual address, and shortening an addressing time.

Figure 2:
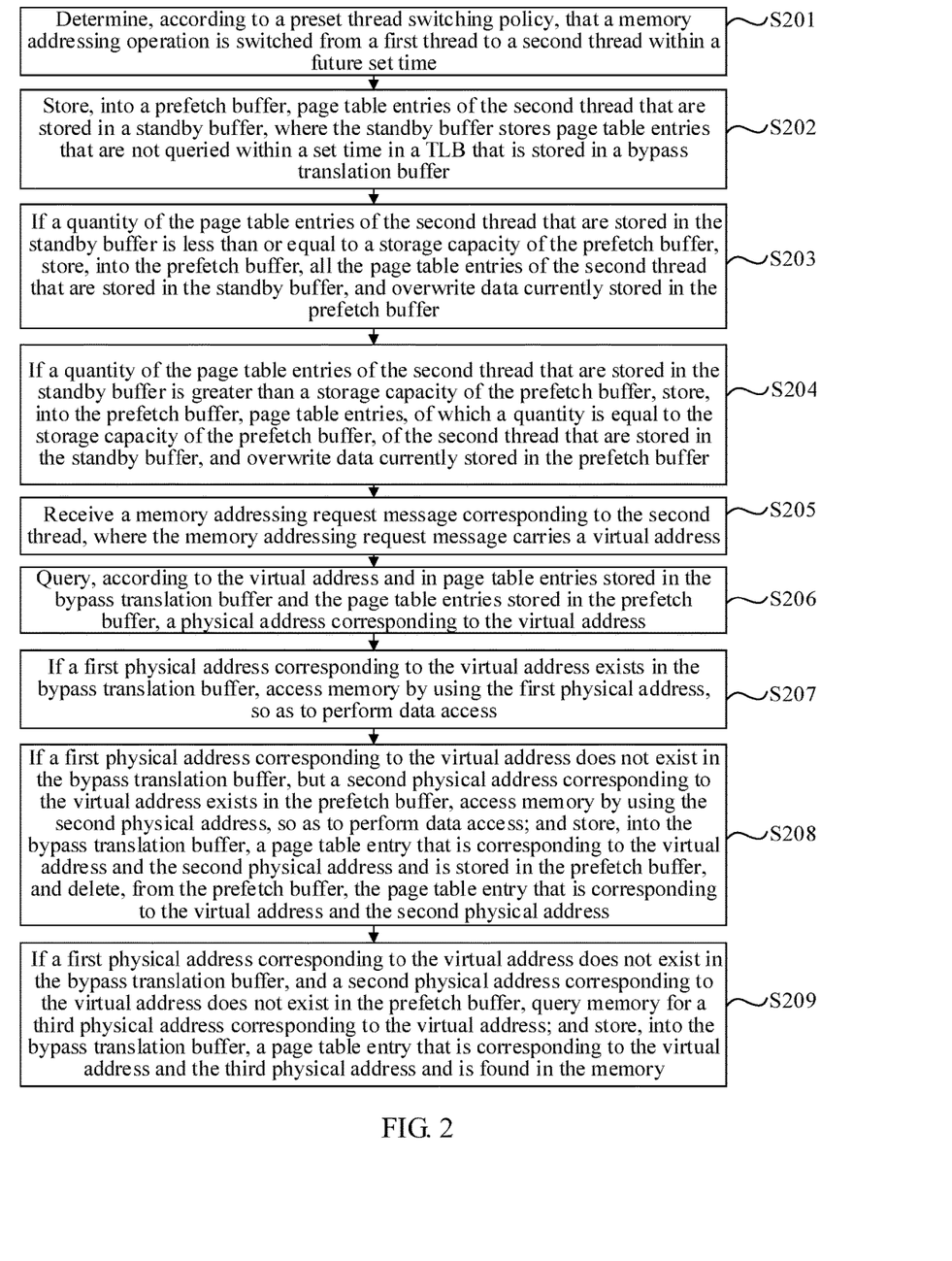
FIG. 2 is a schematic flowchart of another embodiment of a method for querying a physical memory address according to the present disclosure.

FIG. 2 is a schematic flowchart of another embodiment of a method for querying a physical memory address according to the present disclosure. As shown in FIG. 2, the method provided in the following method embodiment may be applicable to various types of terminal devices, such as a PC, a PAD, and a mobile phone. The following steps may be performed by a CPU, and may be performed by a MMU in the CPU, and the like. The method may further include the following steps.

Step S201: Determine, according to a preset thread switching policy, that a memory addressing operation is switched from a first thread to a second thread within a future set time.

Furthermore, the thread switching policy includes using which threads to perform a memory addressing operation within each time period during running of a terminal device. In this embodiment of the present disclosure, the first thread is a thread that performs a memory addressing operation within a previous time period, and the second thread is a thread that performs a memory addressing operation after the first thread, that is, a thread that is to perform addressing.

Step S202: Store, into a prefetch buffer, page table entries of the second thread that are stored in a standby buffer, where the standby buffer stores page table entries that are not queried within a set time in a TLB that is stored in a bypass translation buffer.

The following step S203 or step S204 may be selectively performed herein according to a relationship between a quantity of the PTEs of the second thread that are stored in the standby buffer and a storage capacity of the PB.

Step S203: If the quantity of the page table entries of the second thread that are stored in the standby buffer is less than or equal to the storage capacity of the prefetch buffer, store, into the prefetch buffer, all the page table entries of the second thread that are stored in the standby buffer, and overwrite data currently stored in the prefetch buffer.

Step S204: If the quantity of the page table entries of the second thread that are stored in the standby buffer is greater than the storage capacity of the prefetch buffer, store, into the prefetch buffer, page table entries, of which a quantity is equal to the storage capacity of the prefetch buffer, of the second thread that are stored in the standby buffer, and overwrite data currently stored in the prefetch buffer.

Furthermore, the thread that is to perform addressing and determined according to step S201, that is, the second thread, stores, into the PB, a part or all of the PTEs of the second thread that are stored in the standby buffer, and deletes the data currently stored in the PB, where the standby buffer stores the PTEs that are not queried within the set time in the TLB that is stored in the bypass translation buffer.

Figure 3:
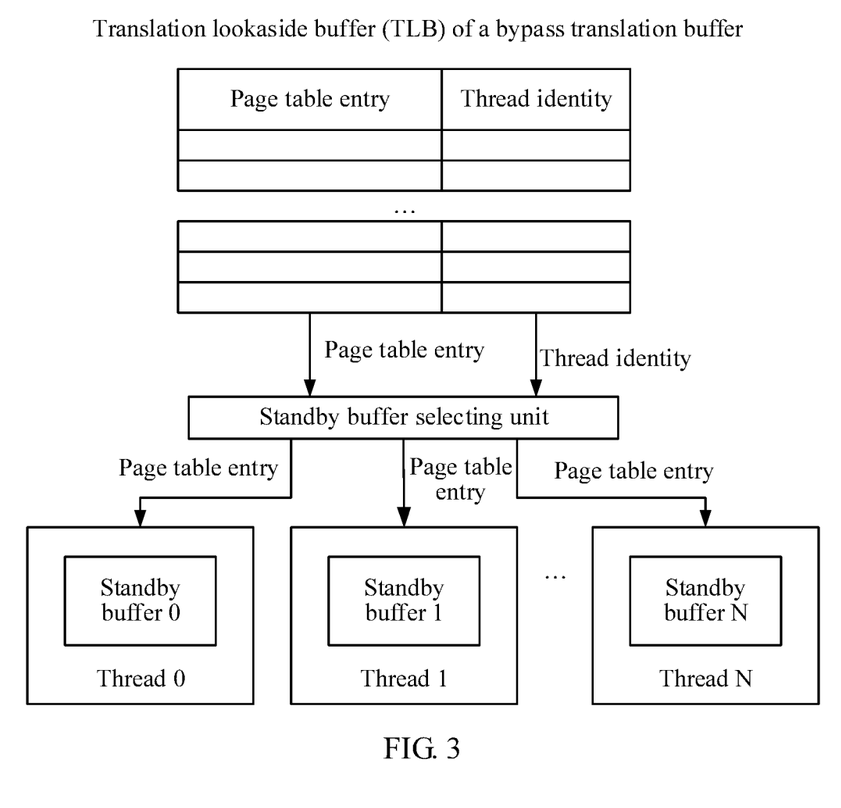
FIG. 3 is a schematic diagram of storing, into a standby buffer of a corresponding thread, PTEs that are not queried within a set time in a TLB of a bypass translation buffer.

As an optional implementation manner, each thread may be corresponding to one standby buffer, and page table entries stored in each standby buffer may be page table entries of a corresponding thread that are not queried within a set time in a TLB. FIG. 3 is a schematic diagram of storing, into a standby buffer of a corresponding thread, page table entries that are not queried within a set time in a TLB of a bypass translation buffer. As shown in FIG. 3, the page table entries stored in the TLB of the bypass translation buffer may include a correspondence between a virtual address and a physical address, and an identity of each corresponding thread, and PTEs that are stored in a standby buffer corresponding to each thread may include a correspondence between a virtual address and a physical address. A standby buffer selecting unit receives the PTEs that are not queried within the set time and are stored in the TLB and a corresponding thread identity, and stores the PTEs into a standby buffer of a corresponding thread according to the thread identity.

Figure 4:
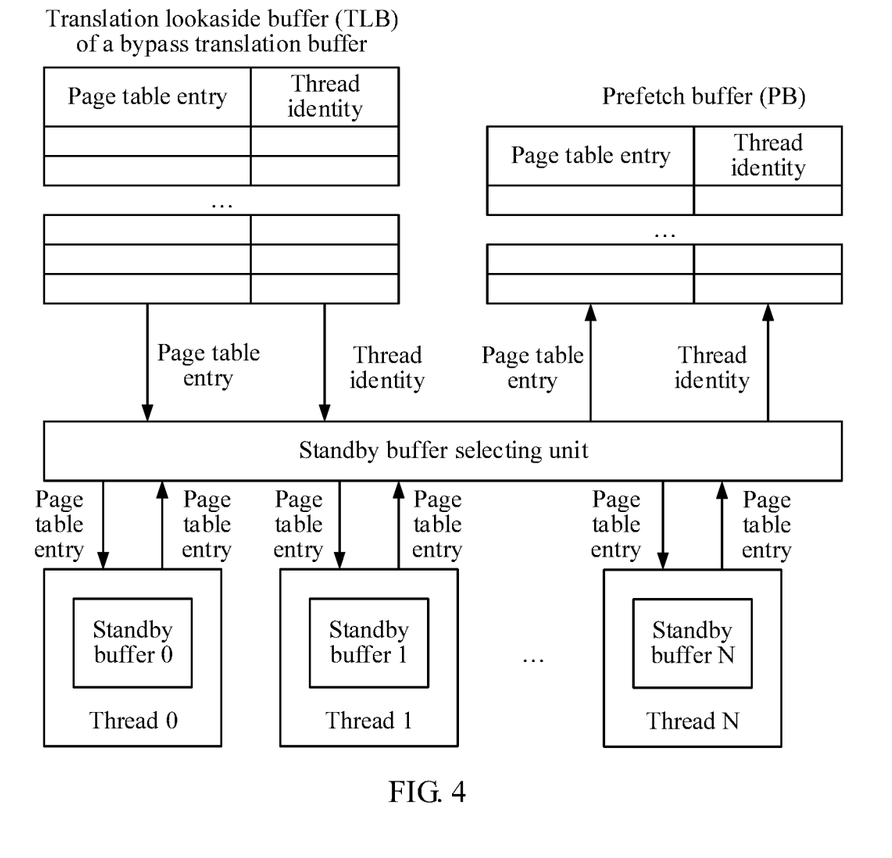
FIG. 4 is a schematic diagram of storing PTEs in a standby buffer of a corresponding thread into a PB.

FIG. 4 is a schematic diagram of storing, into a PB, PTEs in a standby buffer of a corresponding thread. As shown in FIG. 4, a standby buffer selecting unit stores, into a PB according to a determined thread that is to perform addressing, a corresponding thread identity and a part or all of PTEs in a standby buffer of the thread that is to perform addressing, such that the PB stores PTEs of the thread that is to perform addressing that are replaced in the TLB. Most of these PTEs replaced in the TLB are replaced not because the PTEs are not required, but because a storage capacity of the TLB is limited and a quantity of threads is large, commonly-used PTEs of some threads are replaced.

It is assumed herein that 32 threads share one bypass translation buffer with a storage capacity of 128 PTEs, and a storage capacity of a standby buffer corresponding to each thread and a storage capacity of a PB corresponding to each thread may be set to 32 page table entries, and before the thread that is to perform addressing performs addressing, all the PTEs in the standby buffer corresponding to the thread that is to perform addressing may be stored into the PB, and data currently stored in the PB may be deleted. The bypass translation buffer and the PB may complete comparison between VAs using a content addressable memory (CAM). An increase of the storage capacity of the PB may increase chip power consumption, and therefore, a PB with a relatively small storage capacity, for example, a PB with a storage capacity of eight PTEs, may be selected, such that before the thread that is to perform addressing performs addressing, eight page table entries with a shortest storage time in the standby buffer corresponding to the thread that is to perform addressing may be stored into the PB, and data currently stored in the PB may be deleted.

Step S205: Receive a memory addressing request message corresponding to the second thread, where the memory addressing request message carries a virtual address.

Furthermore, the memory addressing request message corresponding to the thread that is to perform addressing, that is, the second thread, is received, where the memory addressing request message carries a to-be-addressed VA.

Step S206: Query, according to the virtual address and in page table entries stored in the bypass translation buffer and the page table entries stored in the prefetch buffer, a physical address corresponding to the virtual address.

The following step S207, step S208, or step S209 may be selectively performed herein according to an addressing result in the bypass translation buffer and the PB.

Step S207: If a first physical address corresponding to the virtual address exists in the bypass translation buffer, access memory using the first physical address, in order to perform data access.

Step S208: If a first physical address corresponding to the virtual address does not exist in the bypass translation buffer, but a second physical address corresponding to the virtual address exists in the prefetch buffer, access memory using the second physical address, in order to perform data access, and store, into the bypass translation buffer, a page table entry that is corresponding to the virtual address and the second physical address and is stored in the prefetch buffer, and delete, from the prefetch buffer, the page table entry that is corresponding to the virtual address and the second physical address.

If the quantity of the PTEs of the second thread that are stored in the standby buffer is greater than the storage capacity of the prefetch buffer, a PTE, except the PTEs stored in the prefetch buffer, of the PTEs of the second thread that are stored in the standby buffer is stored into the prefetch buffer.

Step S209: If a first physical address corresponding to the virtual address does not exist in the bypass translation buffer, and a second physical address corresponding to the virtual address does not exist in the prefetch buffer, query memory for a third physical address corresponding to the virtual address, and store, into the bypass translation buffer, a page table entry that is corresponding to the virtual address and the third physical address and is found in the memory.

Figure 5:
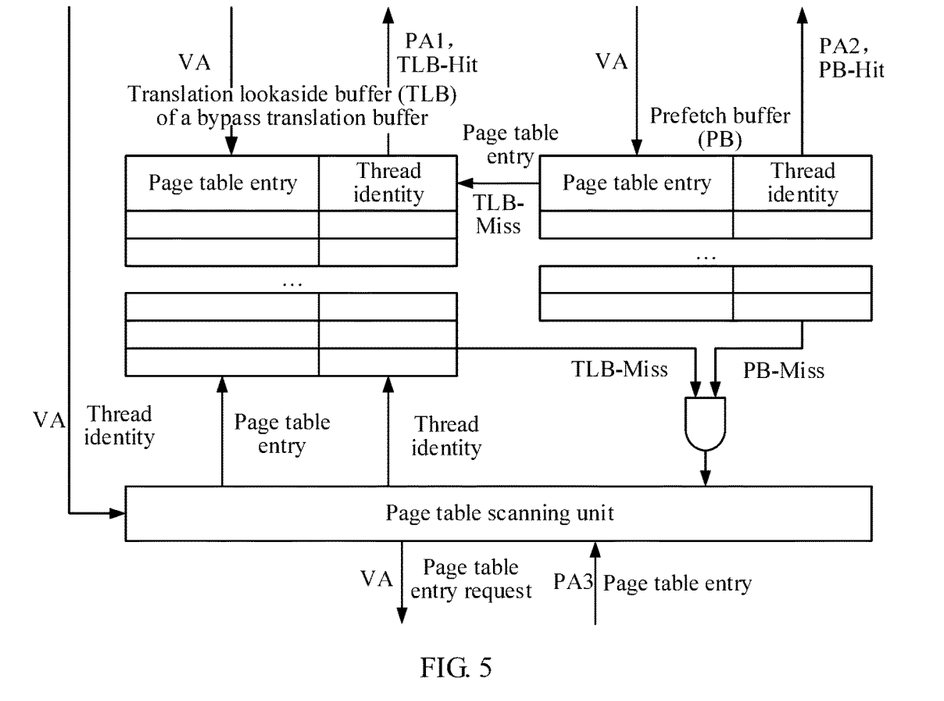
FIG. 5 is a schematic diagram of addressing a physical memory address according to a VA.

FIG. 5 is a schematic diagram of addressing a physical memory address according to a VA. As shown in FIG. 5, PTEs stored in a bypass translation buffer and PTEs stored in a PB may be queried at the same time according to a VA.

When a physical address corresponding to the VA exists in the bypass translation buffer, that is, when a TLB of the bypass translation buffer is hit (i.e. TLB-Hit), no matter whether the physical address corresponding to the VA exists in the PB, that is, the PB is hit (i.e. PB-Hit) or missed (i.e. PB-Miss), data access is performed according to the physical address, that is, a first physical address PA1, found in the bypass translation buffer.

When the physical address corresponding to the VA does not exist in the bypass translation buffer, that is, when the TLB of the bypass translation buffer is missed (i.e. TLB-Miss), but the physical address corresponding to the VA exists in the PB, that is, the PB is hit (i.e. PB-Hit), data access is performed according to the physical address found in the PB, that is, a second physical address PA2, and a found PTE, that is, a hit PTE, is stored into the TLB of the bypass translation buffer. When the PB stores only a part of PTEs of a second thread in the standby buffer, for example, the foregoing PB stores only eight PTEs, with a shortest storage time in the standby buffer, of the second thread, after the hit PTE in the PB is stored into the TLB, a next PTE, with a relatively short storage time, of the second thread may be read from the standby buffer and stored into the PB.

When the physical address corresponding to the VA exists in neither the bypass translation buffer nor the PB, that is, when both the bypass translation buffer and the PB are missed (i.e. TLB-Miss and PB-Miss), memory is queried using a page table scanning unit according to the VA and a corresponding thread identity for the physical address corresponding to the VA, that is, a third physical address PA3, data access is performed according to the found third physical address PA3, and a found page table entry, that is, a hit page table entry, and the corresponding thread identity are stored into the TLB of the bypass translation buffer at the same time.

For step S208 or step S209, if a quantity of PTEs stored in the bypass translation buffer exceeds a storage capacity of the bypass translation buffer, the PTEs that are not queried within the set time in the bypass translation buffer are stored into the standby buffer, and the PTEs that are not queried within the set time are deleted from the bypass translation buffer.

Furthermore, when the quantity of the PTEs stored in the bypass translation buffer exceeds the storage capacity of the bypass translation buffer, a PTE with a lowest hit rate, that is, a PTE missed within the set time, is stored into the standby buffer preferentially, and the PTE missed within the set time is deleted.

If a quantity of PTE stored in the standby buffer exceeds a storage capacity of the standby buffer, a page table entry with a longest storage time is deleted from the standby buffer.

A longer storage time of a page table entry in the standby buffer indicates a lower hit rate of the PTE, and therefore, a storage mode of first input first output (FIFO) may be used in the standby buffer, that is, when the quantity of the PTEs stored in the standby buffer exceeds the storage capacity of the standby buffer, the PTE with the longest storage time is deleted preferentially.

According to the method for querying a physical memory address provided in this embodiment, a bypass translation buffer and a prefetch buffer are queried at the same time according to a to-be-addressed virtual address of a second thread, where the prefetch buffer stores PTEs of the second thread that are not queried within a set time in the bypass translation buffer, thereby increasing a hit rate of querying a physical address corresponding to a virtual address, and shortening an addressing time.

Figure 6:
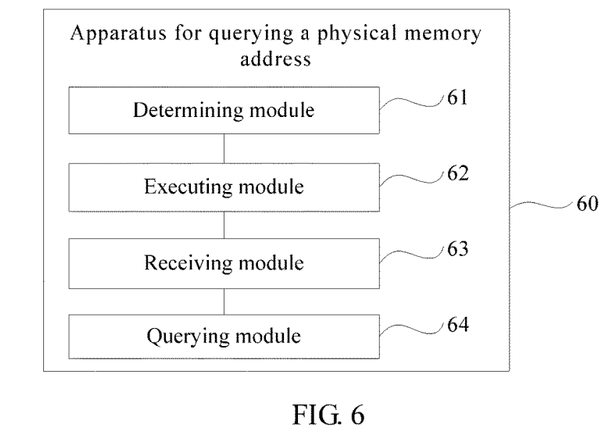
FIG. 6 is a schematic structural diagram of an embodiment of an apparatus for querying a physical memory address according to the present disclosure.

FIG. 6 is a schematic structural diagram of an embodiment of an apparatus for querying a physical memory address according to the present disclosure. As shown in FIG. 6, an apparatus 60 for querying a physical memory address in this embodiment is a specific entity for performing the foregoing method for querying a physical memory address, and may include a determining module 61, an executing module 62, a receiving module 63, and a querying module 64.

The determining module 61 is configured to determine, according to a preset thread switching policy, that a memory addressing operation is switched from a first thread to a second thread within a future set time.

Furthermore, the thread switching policy includes using which threads to perform a memory addressing operation within each time period during running of a terminal device. In this embodiment of the present disclosure, the first thread is a thread that performs a memory addressing operation within a previous time period, and the second thread is a thread that performs a memory addressing operation after the first thread, that is, a thread that is to perform addressing.

The executing module 62 is configured to store, into a prefetch buffer, PTEs of the second thread that are stored in a standby buffer, where the standby buffer stores PTEs that are not queried within a set time in a TLB that is stored in a bypass translation buffer.

Furthermore, the following two cases exist according to a relationship between a quantity of the PTEs of the second thread that are stored in the standby buffer and a storage capacity of the PB.

Case 1: If the quantity of the PTEs of the second thread that are stored in the standby buffer is less than or equal to the storage capacity of the prefetch buffer, all the PTEs of the second thread that are stored in the standby buffer are stored into the prefetch buffer, and data currently stored in the prefetch buffer is overwritten.

Case 2: If the quantity of the PTEs of the second thread that are stored in the standby buffer is greater than the storage capacity of the prefetch buffer, PTEs, of which a quantity is equal to the storage capacity of the prefetch buffer, of the second thread that are stored in the standby buffer are stored into the prefetch buffer, and data currently stored in the prefetch buffer is overwritten.

Furthermore, according to the thread that is to perform addressing and determined by the determining module 61, that is, the second thread, a part or all of the PTEs entries of the second thread that are stored in the standby buffer are stored into the PB, where the standby buffer stores the PTEs that are not queried within the set time in the TLB that is stored in the bypass translation buffer. Optionally, the page table entries stored in the standby buffer may include a correspondence between a virtual address and a physical address, and an identity of each corresponding thread. Similarly, PTEs stored in the bypass translation buffer may also include a correspondence between a virtual address and a physical address, and an identity of each corresponding thread, and the PTEs stored in the PB may further include a correspondence between a virtual address and a physical address, and an identity of a corresponding thread that is to perform addressing.

It should be noted herein that a quantity of standby buffers may be one or multiple. For example, each thread may be corresponding to one standby buffer, where the standby buffer is used to store PTEs of the thread that are not queried within a set time in a bypass translation buffer. Similarly, both a quantity of bypass translation buffers and a quantity of prefetch buffers may be one or multiple. For example, each thread may be corresponding to one bypass translation buffer and one prefetch buffer.

The receiving module 63 is configured to receive a memory addressing request message corresponding to the second thread, where the memory addressing request message carries a virtual address.

Furthermore, the memory addressing request message corresponding to the thread that is to perform addressing, that is, the second thread, is received, where the memory addressing request message carries a to-be-addressed VA.

The querying module 64 is configured to query, according to the virtual address and in PTEs stored in the bypass translation buffer and the PTEs stored in the prefetch buffer, a physical address corresponding to the virtual address.

Furthermore, the PTEs stored in the bypass translation buffer and the PTEs stored in the PB may be queried at the same time according to the VA. The following three cases may exist herein according to an addressing result in the bypass translation buffer and the PB.

Case 1: If a first physical address corresponding to the virtual address exists in the bypass translation buffer, memory is accessed using the first physical address, in order to perform data access.

Furthermore, when a physical address corresponding to the VA exists in the bypass translation buffer, no matter whether the physical address corresponding to the VA exists in the PB, data access is performed according to the physical address found in the bypass translation buffer, that is, the first physical address.

Case 2: If a first physical address corresponding to the virtual address does not exist in the bypass translation buffer, but a second physical address corresponding to the virtual address exists in the prefetch buffer, memory is accessed using the second physical address, in order to perform data access, and a PTE that is corresponding to the virtual address and the second physical address and is stored in the prefetch buffer is stored into the bypass translation buffer, and the PTE that is corresponding to the virtual address and the second physical address and is stored in the prefetch buffer is deleted.

If the quantity of the PTEs of the second thread that are stored in the standby buffer is greater than the storage capacity of the prefetch buffer, the first physical address corresponding to the virtual address does not exist in the bypass translation buffer, but the second physical address corresponding to the virtual address exists in the prefetch buffer, a PTE, except the PTEs stored in the prefetch buffer, of the PTEs of the second thread that are stored in the standby buffer is stored into the prefetch buffer.

Furthermore, when the physical address corresponding to the VA does not exist in the bypass translation buffer, but the physical address corresponding to the VA exists in the PB, data access is performed according to the physical address found in the PB, that is, the second physical address, and a found PTE, that is, a hit page table entry, is stored into the TLB of the bypass translation buffer. When the PB stores only a part of the PTEs of the second thread in the standby buffer, after the hit PTE in the PB is stored into the TLB, one PTE may be read from the standby buffer and stored into the PB.

Case 3: If a first physical address corresponding to the virtual address does not exist in the bypass translation buffer, and a second physical address corresponding to the virtual address does not exist in the prefetch buffer, memory is queried for a third physical address corresponding to the virtual address, and a PTE that is corresponding to the virtual address and the third physical address and is found in the memory is stored into the bypass translation buffer.

Furthermore, when the physical address corresponding to the VA exists in neither the bypass translation buffer nor the PB, that is, when both the bypass translation buffer and the PB are missed, the memory needs to be queried for the physical address corresponding to the VA, that is, the third physical address, and a found PTE, that is, a hit page table entry, is stored into the TLB of the bypass translation buffer.

The executing module 62 may further be configured to, before the PTEs of the second thread that are stored in the standby buffer are stored into the prefetch buffer, if a quantity of PTEs stored in the bypass translation buffer exceeds a storage capacity of the bypass translation buffer, store, into the standby buffer, the PTEs that are not queried within the set time in the bypass translation buffer, and delete the PTEs that are not queried within the set time from the bypass translation buffer.

Furthermore, when the quantity of the PTEs stored in the bypass translation buffer exceeds the storage capacity of the bypass translation buffer, a PTE with a lowest hit rate, that is, a PTE missed within the set time, is stored into the standby buffer preferentially, and the PTE missed within the set time is deleted.

The executing module 62 may further be configured to, after the PTEs that are not queried within the set time in the bypass translation buffer are stored into the standby buffer, if a quantity of PTEs stored in the standby buffer exceeds a storage capacity of the standby buffer, delete a PTE with a longest storage time from the standby buffer.

A longer storage time of a PTE in the standby buffer indicates a lower hit rate of the PTE, and therefore, a storage mode of FIFO may be used in the standby buffer, that is, when the quantity of the PTE stored in the standby buffer exceeds the storage capacity of the standby buffer, the PTE with the longest storage time is deleted preferentially.

According to the apparatus for querying a physical memory address provided in this embodiment, a bypass translation buffer and a prefetch buffer are queried at the same time according to a to-be-addressed virtual address of a second thread, where the prefetch buffer stores PTEs of the second thread that are not queried within a set time in the bypass translation buffer, thereby increasing a hit rate of querying a physical address corresponding to a virtual address, and shortening an addressing time.

Figure 7:
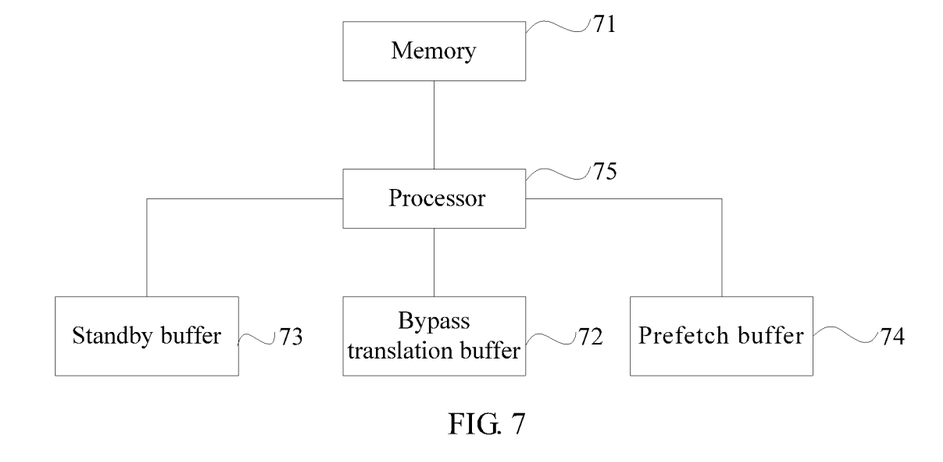
FIG. 7 is a schematic structural diagram of another embodiment of an apparatus for querying a physical memory address according to the present disclosure.

FIG. 7 is a schematic structural diagram of another embodiment of an apparatus for querying a physical memory address according to the present disclosure. As shown in FIG. 7, the apparatus for querying a physical memory address in this embodiment includes a memory 71, a bypass translation buffer 72, a standby buffer 73, a prefetch buffer 74, and a processor 75.

The memory 71 is configured to store an instruction.

The bypass translation buffer 72 is configured to store a TLB.

The standby buffer 73 is configured to store PTEs that are not queried within a set time in the TLB that is stored in the bypass translation buffer.

The prefetch buffer 74 is configured to store PTEs of a corresponding thread that are stored in the standby buffer.

The processor 75 is configured to run the instruction stored in the memory, in order to perform the method for querying a physical memory address shown in FIG. 1 or FIG. 2.

Furthermore, the memory 71 may include a high-speed random access memory (RAM), or may include a non-volatile memory, for example, at least one disk memory. Optionally, the memory 71 may include at least one storage apparatus. The memory 71 stores the instruction, and when the apparatus for querying a physical memory address runs, the processor 75 communicates with the memory 71, and the processor 75 executes the instruction, such that the apparatus for querying a physical memory address can perform the methods for querying a physical memory address provided in the embodiments of the present disclosure.

The standby buffer 73 may store PTEs that include a correspondence between a virtual address and a physical address and include an identity of each corresponding thread. The bypass translation buffer 72 may store PTEs that include a correspondence between a virtual address and a physical address and include an identity of each corresponding thread, and the prefetch buffer 74 may store PTEs that include a correspondence between a virtual address and include an identity of a corresponding thread that is to perform addressing.

It should be noted herein that a quantity of the standby buffers 73 may be one or multiple. For example, each thread may be corresponding to one standby buffer, where the standby buffer is used to store PTEs of the thread that are not queried within a set time in a bypass translation buffer. Similarly, both a quantity of the bypass translation buffers 72 and a quantity of the prefetch buffers 74 may be one or multiple. For example, each thread may be corresponding to one bypass translation buffer and one prefetch buffer.

The processor in this embodiment may be an integrated circuit chip, and has a signal processing capability. In an implementation process, the steps in the foregoing methods may be completed using an integrated logic circuit of hardware in the processor or an instruction in a form of software. The foregoing processor may be a general purpose processor, a digital signal processor (DSP), an application-specific integrated circuit (ASIC), a field programmable gate array (FPGA) or another programmable logic component, a discrete gate or a transistor logic component, or a discrete hardware component, which may implement or perform the methods, the steps, and the logical block diagrams disclosed in the embodiments of the present disclosure. The foregoing processor may be a microprocessor, or the foregoing processor may be any conventional processor, or the like. The steps of the methods disclosed with reference to the embodiments of the present disclosure may be directly performed and completed by means of a hardware processor, or may be performed and completed using a combination of a hardware module and a software module in the processor. The software module may be located in a mature storage medium in the field, such as a RAM, a flash memory, a read-only memory, a programmable read-only memory, an electrically-erasable programmable memory, or a register. The storage medium is located in a memory, and the processor reads information in the memory and completes the steps in the foregoing methods in combination with hardware of the processor.

This embodiment of the present disclosure further provides a chip, where the chip is configured to query a physical memory address, and the chip may include the foregoing processor.

According to the apparatus for querying a physical memory address provided in this embodiment, the processor 75 executes an instruction stored in the memory 71, and queries a bypass translation buffer and a prefetch buffer at the same time according to a to-be-addressed virtual address of a second thread, where the prefetch buffer stores PTEs of the second thread that are not queried within a set time in the bypass translation buffer, thereby increasing a hit rate of querying a physical address corresponding to a virtual address, and shortening an addressing time.

Persons of ordinary skill in the art may understand that all or some of the steps of the foregoing method embodiments may be implemented by a program instructing related hardware. The foregoing program may be stored in a computer-readable storage medium. When the program runs, the steps of the foregoing method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. However, these modifications or replacements do not make the essence of corresponding technical solutions depart from the scope of the technical solutions in the embodiments of the present disclosure.

What is claimed is:

1. A method for querying a physical address to access a memory, the method comprising:
deleting data stored in a prefetch buffer;
storing, after deleting the data, page table entries of a second thread into the prefetch buffer when determining that a memory addressing operation will be switched from a first thread to the second thread within a future set time, wherein the page table entries of the second thread were previously stored in a standby buffer corresponding to only the second thread, and wherein the standby buffer stores page table entries of the second thread that are not queried within a set time in a translation lookaside buffer (TLB);
receiving a memory addressing request message corresponding to the second thread, wherein the memory addressing request message comprises a virtual address; and
querying, in parallel, page table entries stored in the TLB and the page table entries stored in the prefetch buffer for the virtual address.

2. The method of claim 1, further comprising:
retrieving a first physical address corresponding to the virtual address when the virtual address exists in the TLB; and
accessing the memory using the first physical address.

3. The method of claim 1, further comprising:
retrieving a second physical address corresponding to the virtual address when the virtual address exists in the prefetch buffer; and
accessing the memory using the second physical address.

4. The method of claim 3, further comprising storing, into the TLB, a page table entry from the prefetch buffer, the page table entry comprising the virtual address and the second physical address.

5. The method of claim 4, further comprising deleting, from the prefetch buffer, the page table entry comprising the virtual address and the second physical address.

6. The method of claim 1, further comprising:
querying the memory for a third physical address corresponding to the virtual address when the virtual address does not exist in the TLB or the prefetch buffer.

7. The method of claim 6, further comprising storing, into the TLB, another page table entry from the memory, the another page table entry comprising the virtual address and the third physical address.

8. The method of claim 1, further comprising, storing, into the standby buffer, the page table entries that are not queried within the set time in the TLB prior to storing page table entries of the second thread into the prefetch buffer.

9. The method of claim 8, wherein after storing, into the standby buffer, the page table entries, the method further comprises deleting, from the TLB, the page table entries when a quantity of other page table entries stored in the TLB exceeds a storage capacity of the TLB.

10. The method of claim 8, wherein after storing into the standby buffer, the page table entries, the method further comprises deleting another page table entry with a longest storage time from the standby buffer when a quantity of page table entries stored in the standby buffer exceeds a storage capacity of the standby buffer.

11. A multi-threaded processor coupled to a memory, wherein the multi-threaded processor comprises:
a translation lookaside buffer (TLB);
a prefetch buffer;
a standby buffer corresponding to only a second thread, coupled to the TLB and the prefetch buffer, and configured to store page table entries of the second thread that are not queried within a set time in the TLB;
a memory manager coupled to the TLB, the prefetch buffer and the standby buffer, wherein the memory manager is configured to:
delete data stored in a prefetch buffer;
store, after deleting the data, page table entries of the second thread into the prefetch buffer when determining, according to a preset thread switching policy, that a memory addressing operation will be switched from a first thread to the second thread within a future set time, wherein the page table entries of the second thread were previously stored in the standby buffer, and wherein the standby buffer stores page table entries that are not queried within a set time in the TLB;
receive a memory addressing request message corresponding to the second thread, wherein the memory addressing request message comprises a virtual address; and
query, in parallel, page table entries stored in the TLB and the page table entries stored in the prefetch buffer for the virtual address.

12. The multi-threaded processor of claim 11, wherein the memory manager is further configured to:
retrieve a first physical address corresponding to the virtual address when the virtual address exists in the TLB; and
access the memory using the first physical address.

13. The multi-threaded processor of claim 11, wherein the memory manager is further configured to:
retrieve a second physical address corresponding to the virtual address when the virtual address exists in the prefetch buffer; and
access the memory using the second physical address.

14. The multi-threaded processor of claim 13, wherein the memory manager is further configured to store, into the TLB, a page table entry from the prefetch buffer, the page table entry comprising the virtual address and the second physical address.

15. The multi-threaded processor of claim 14, wherein the memory manager is further configured to delete, from the prefetch buffer, the page table entry comprising the virtual address and the second physical address.

16. The multi-threaded processor of claim 11, wherein the memory manager is further configured to query the memory for a third physical address corresponding to the virtual address when the virtual address does not exist in the TLB or in the prefetch buffer.

17. The multi-threaded processor of claim 16, wherein the memory manager is further configured to store, into the TLB, another page table entry from the memory, the another page table entry comprising the virtual address and the third physical address.

18. The multi-threaded processor of claim 11, wherein the memory manager is further configured to store, into the standby buffer, the page table entries that are not queried within the set time in the TLB.

19. The multi-threaded processor of claim 18, wherein the memory manager is further configured to delete, from the TLB, the page table entries that are not queried within the set time when a quantity of other page table entries stored in the TLB exceeds a storage capacity of the TLB.

20. The multi-threaded processor of claim 18, wherein the memory manager is further configured to delete another page table entry with a longest storage time from the standby buffer when a quantity of page table entries stored in the standby buffer exceeds a storage capacity of the standby buffer.

* * * * *